United States Patent [19]

Gonzalez et al.

[11] Patent Number: 5,796,377
[45] Date of Patent: *Aug. 18, 1998

[54] VIDEO DISPLAY SYSTEM HAVING AN ELECTRONIC SWITCH MATRIX FOR CONTROLLING AN M×N ARRAY OF PIEZOELECTRIC MEMBERS

[75] Inventors: Walter Gonzalez; Andrei Szilagyi, both of Rancho Palos Verdes, Calif.

[73] Assignee: Aura Systems, Inc., El Segundo, Calif.

[ * ] Notice: The term of this patent shall not extend beyond the expiration date of Pat. No. 5,138,309.

[21] Appl. No.: 717,141

[22] Filed: Sep. 20, 1996

Related U.S. Application Data

[63] Continuation of Ser. No. 173,670, Dec. 22, 1993, abandoned, which is a continuation of Ser. No. 791,499, Nov. 12, 1991, abandoned, which is a division of Ser. No. 504,124, Apr. 3, 1990, Pat. No. 5,052,216.

[51] Int. Cl.$^6$ ............................................. G09G 3/34
[52] U.S. Cl. .......................................... 345/84; 345/55
[58] Field of Search .................................. 340/752, 783; 358/61, 62; 359/224, 782; 345/55, 30, 84, 85, 86, 59, 109, 205, 206, 214

[56] References Cited

U.S. PATENT DOCUMENTS

| | | | |
|---|---|---|---|
| 3,921,164 | 11/1975 | Anderson | 345/192 |
| 4,074,253 | 2/1978 | Nadir | 340/324 |
| 4,626,837 | 12/1986 | Priestly | 340/723 |
| 4,705,365 | 11/1987 | Wakita et al. | 350/487 |
| 4,716,403 | 12/1987 | Morozumi | 340/702 |
| 4,978,952 | 12/1990 | Irwin | 340/795 |
| 5,126,836 | 6/1992 | Um | 358/60 |
| 5,138,309 | 8/1992 | Gonzalez | 345/84 |

*Primary Examiner*—Chanh Nguyen
*Attorney, Agent, or Firm*—Kathy Mojibi Kavcioglu

[57] ABSTRACT

A video display system having an electrically insulative substrate with a top surface, a bottom surface, and an M×N array of holes between the top and bottom surfaces. The M×N array of holes corresponds to an M×N array of pixels. The system further includes piezoelectric members, each piezoelectric member disposed on the top surface adjacent to each of the holes. Each of the piezoelectric members has two metallized faces and a mirror mounted to the member. An integrated circuit electronic switch matrix is mounted to the bottom surface of the substrate. One of the metallized faces is electrically connected through the holes to the piezoelectric members. The other metallized face is electrically connected to ground. The switch matrix develops electrical signals, with each signal corresponding to an intensity of one of the pixels. The electrical signals are applied to each of the piezoelectric members, each of the piezoelectric members in response thereto changing an orientation of the mirror mounted thereto. Each of the mirrors therefore effects modulation of light intensity reflected from the mirror, and the modulated light intensity from each of the mirrors corresponds to one of the pixels.

5 Claims, 4 Drawing Sheets

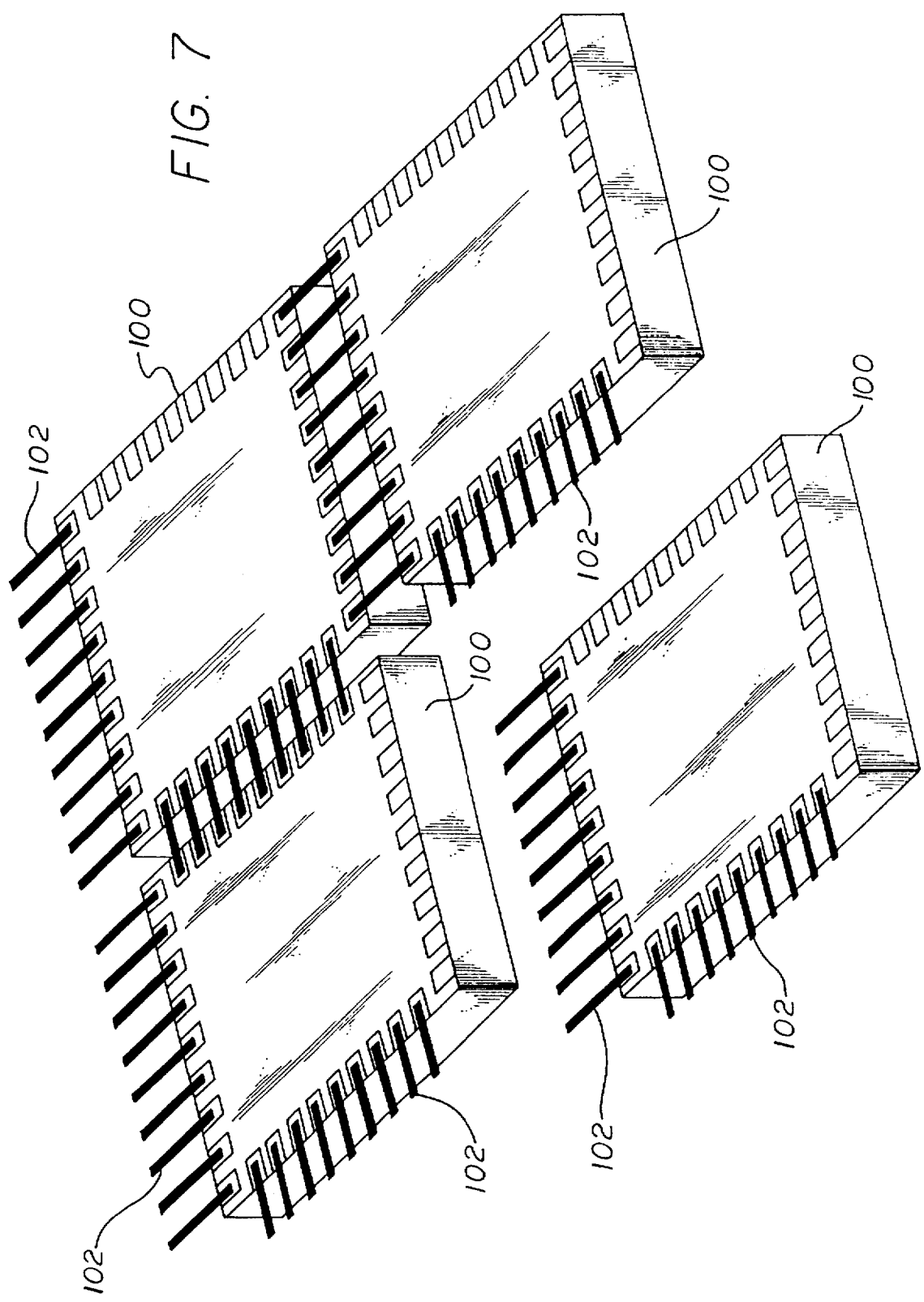

VIDEO DISPLAY SYSTEM HAVING AN ELECTRONIC SWITCH MATRIX FOR CONTROLLING AN M×N ARRAY OF PIEZOELECTRIC MEMBERS

This application is a continuation of application Ser. No. 08/173,670 filed on Dec. 22, 1993, now abandoned which is continuation of application Ser. No. 07/791,499 filed Nov. 12, 1991, now abandoned, which is a divisional of application Ser. No. 07/504,124 filed Apr. 3, 1990, now U.S. Pat. No. 5,052,216.

RELATED APPLICATION DATA

The following disclosure is related to the disclosure of the commonly owned application, Ser. No. 07/478,139, filed Feb. 9, 1990, now U.S. Pat. No. 5,035,475.

FIELD OF INVENTION

The present invention relates generally to electronic switching matrices and more particularly to a novel switch matrix controlling the scanning of pixels in a video display system.

BACKGROUND OF INVENTION

Video display systems generally display an image as an M×N array of pixels. In one particular class of video display systems, known as optical projection systems, one or more beams of light are modulated in accordance with electrical signals received from an electronic controller. In the case of a single modulated beam, the beam is scanned horizontally in successive lines on a screen to develop the image. With multiple modulated beams, each beam may be used to scan one row, respectively, in the image. The multiple beams would simultaneously traverse the screen in a pattern called "push trace" scanning. During the horizontal scanning, the beam intensity in each beam is modulated for each column of pixels to form the image.

A multiple beam system is disclosed in co-pending, commonly owned application, Ser. No. 429,987, filed Nov. 1, 1989, entitled "Unique Modulation Television." The disclosed multiple beam system includes a M×1 mirror array wherein M is equal to the number of horizontal lines in the pixel array. In one of the embodiments, the mirrors in the array are pivotally mounted along one of their edges to a base plate. Mounted to an opposite edge of each mirror and also to the base plate is a piezoelectric crystal, such that there is one piezoelectric crystal for each mirror. The mirror array is uniformly illuminated and the reflected light beam from each mirror is incident upon a slit. By applying electrical signals to the piezoelectric crystals, the position of each of the mirrors is altered, thereby causing a slight deviation in the path of each of the reflected beams. As the path of each beam is changed, the amount of light from each beam which passes through the slit varies, thereby modulating the intensity of the beam. Each modulated beam is then incident on a rotating polygonal mirror which horizontally sweeps each of the beams across a screen. As the beams are being horizontally swept, the electrical signals to each of the piezoelectric crystals may be changing to vary the intensity for each column of pixels in the resultant displayed image. As disclosed in this prior filed application, the electrical signals are exemplarily provided by clocking data from a bit mapped memory, wherein the data clock is synchronous with the scan rate in the pixel array.

The rotating mirror which provides the horizontal sweep may be eliminated by providing an M×N mirror array. The reflected beam from each mirror is used to develop each pixel in the displayed M×N image. An example of a video display system using an M×N mirror array is disclosed in co-pending commonly owned application, Ser. No. 448,748, filed Dec. 11, 1989, entitled "Unique Modulation Television." Similarly to the system disclosed in the above mentioned prior filed application, each beam is modulated by applying an electric signal to each piezoelectric crystal under each mirror.

In each of the above mentioned prior filed applications, several types of mirror arrays are disclosed. Although it is within one of ordinary skill in the art to develop the appropriate electrical signals for application to the piezoelectric crystals, it would be desirable to provide a switching matrix which is easily integratable, both electronically and structurally, with the mirror array.

SUMMARY OF THE INVENTION

In the following specification, an electronic switch matrix for a video display system is disclosed. The video display system develops an M×N array of pixels from a composite video signal and has a plurality of circuit elements, $Z_{ij}$. Each of the circuit elements, $Z_{ij}$, controls the intensity of a respective one of the pixels, wherein $1 \leq i \leq M$ and $1 \leq j \leq N$. As is known, the composite video signal includes a luminance signal, a horizontal sync signal and a vertical sync signal.

According to the present invention, the electronic switch matrix includes a pixel clock, a first counter, a second counter and a plurality of switch cells, $S_{ij}$. The pixel clock develops a pixel clock signal having a plurality of first clock pulses. Each of the first clock pulses occurs at a rate commensurate with the scan rate of the pixels.

The first counter has a clock input, a reset input, at least N first outputs and a second output. The clock input has the pixel clock signal applied thereto. The reset input is adapted to have the horizontal sync signal applied thereto. A $j^{th}$ one of the first outputs is adapted to be coupled electrically to a respective one of the switch cells, $S_{ij}$. The $j^{th}$ one of the first outputs has a first logic state upon occurrence of a $j^{th}$ clock pulse of the first clock pulse subsequent to a sync pulse of the horizontal sync signal. Each of the other first outputs has a second logic state at the $j^{th}$ clock pulse. The second output develops a second clock signal having a plurality of second clock pulses. Each of the second clock pulses occurs when a first one (j=1) of the first outputs is at the first logic state.

The second counter has a clock input, a reset input and at least M outputs. The clock input of the second counter is electrically coupled to the second output of the first counter to apply the second clock signal thereto. The reset input of the second counter is adapted to have the vertical sync signal applied thereto. An $i^{th}$ one of the M outputs is adapted to be coupled electrically to a respective one of the switch cells $S_{ij}$. The $i^{th}$ one of the M outputs has the first logic state upon occurrence of an $i^{th}$ clock pulse of the second clock pulses subsequent to a sync pulse of the vertical sync signal. Each of the other M outputs has a second logic state at the $i^{th}$ clock pulse.

Each of the switch cells $S_{ij}$, is adapted to apply the luminance signal to a respective one of the circuit elements, $Z_{ij}$. The luminance signal is so applied when each of the $i^{th}$ one of the M outputs and the $j^{th}$ one of the N outputs has the first logic state.

In one aspect of the present invention, the circuit elements $Z_{ij}$, may be modelled by the capacitance, $C_{ij}$, across the piezoelectric materials in the mirror arrays disclosed in the above-mentioned copending prior filed applications. The capacitance is due to the metal electrodes on opposite faces of the piezoelectric material and to the dielectric constant of the material. However, it is a feature of the present invention that the electronic switch matrix is adaptable to other types of video display systems, such as the liquid crystal video displays. The circuit element, $Z_{ij}$, instead of being a piezoelectric element, will be the pixel in each of the liquid crystal displays.

An advantage of the present invention is that it is readily constructable on an integrated or hybrid circuit on a first substrate which may then in turn be integrated with a second substrate for either a mirror array or liquid crystal display. A further advantage of the present invention is that only a single high voltage amplifier is required to drive the matrix pixels, rather than the multiplicity of such amplifiers required in conventional video projection systems.

These and other objects, advantages and features of the present invention will become apparent to those skilled in the art from a study of the following description of an exemplary preferred embodiment when read in conjunction with the attached drawings and appended claims.

BRIEF DESCRIPTION OF THE DRAWINGS

FIG. 7 illustrates individual switch matrices packaged in modular integrated circuits, and assembled to form a larger array.

DESCRIPTION OF AN EXEMPLARY PREFERRED EMBODIMENT

Figure 1:
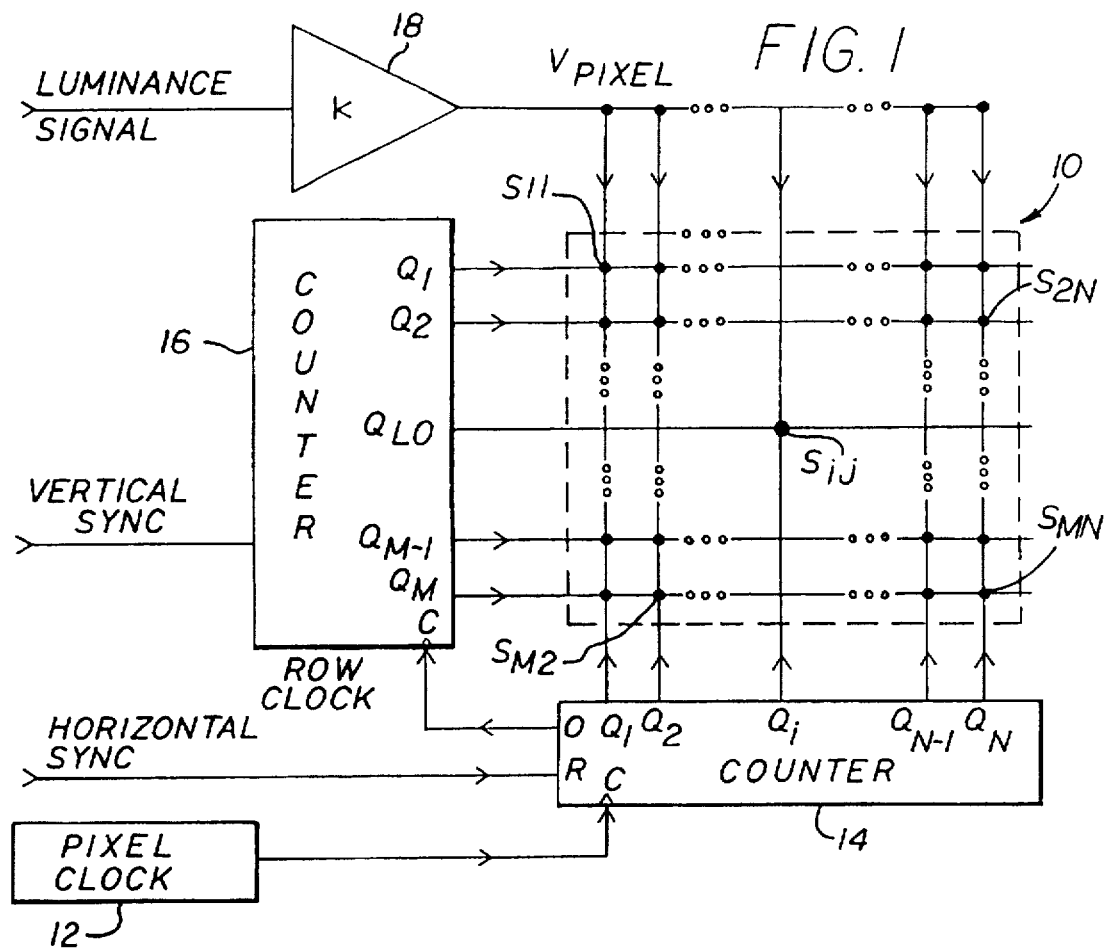
FIG. 1 is a block diagram of an electronic switch matrix having a plurality of switch cells.

Referring now to FIG. 1, there is shown an electronic switch matrix 10 for a video display system (not shown). A video display system typically develops an M×N array of pixels from a composite video signal. Typically, such a system has a plurality of circuit elements, $Z_{ij}$, where $1 \leq i \leq M$ and $1 \leq j \leq N$. As is known in the art, each of the circuit elements, $Z_{ij}$ controls the intensity of a respective one of the pixels. The circuit elements, $Z_{ij}$, will, for purposes of the description hereinbelow, be exemplarily described with particular reference to the inherent capacitance, $C_{ij}$, existing across piezoelectric crystals in the mirror arrays as disclosed in the above mentioned application filed concurrently herewith, and operable as disclosed in each of the above mentioned prior filed applications, all of which are incorporated herein by reference.

Furthermore, the present disclosure will also be made with reference to a composite video signal. As is known, a composite video signal includes a luminance signal, a horizontal sync signal and a vertical sync signal. It is to be noted that the present disclosure is not limited to the use of the composite video but may also be digital video signal such as developed by a bit mapped memory. The inter-changeability and the requirements for using each type of video signal is well known in the art and need not be further described herein.

With particular reference now to FIG. 1, the switch matrix 10 includes a pixel clock 12, a first counter 14, a second counter 16, and a plurality of switch cells, $S_{ij}$. The first counter 16 has a clock input, C, a reset input, R, at least N first outputs, $Q_1$–$Q_N$, and a second output, O. The second counter 16 has a clock input, C, a reset input, R, and at least M outputs, $Q_1$–$Q_M$.

The clock input, C, of the first counter 14 is electrically coupled to the pixel clock 12. The clock input, C, of the second-counter 16 is electrically coupled to the second output, O, of the first counter 14. An $i^{th}$ one, $Q_i$, of the M outputs, $Q_1$–$Q_M$, of the second counter 16 is electrically coupled to a respective one of the switch cells, $S_{ij}$. Similarly, a $j^{th}$ one, $Q_j$, of the N outputs, $Q_1$–$Q_N$, of the first counter is coupled electrically to a respective one of the switch cells, $S_{ij}$. For example, the output $Q_1$ of the first counter 14 and the output $Q_1$ of the second counter 16 are each electrically coupled to the switch cell, $S_{11}$, as best seen in FIG. 1. Other exemplary connections, as above described, are also shown in FIG. 1.

In certain applications, which will be described in greater detail hereinbelow, the switch matrix 10 may also include a high voltage, high speed, linear amplifier 18. The amplifier 18 has an input and an output electrically coupled to each of the switch cells, $S_{ij}$. Generally, the amplifier gain is selected in accordance with the impedance of each of the circuit elements, $Z_{ij}$, of the video display system. For example, when the switch matrix 10 is being used with the piezoelectric activated mirror array as disclosed in the above referenced applications, the circuit element, $Z_{ij}$, is best represented by an high impedance capacitance, $C_{ij}$. The amplifier 18 would preferably produce an output voltage applicable to the chosen modulation technique. For an exemplary piezoelectric mirror array, a pixel voltage, $V_{pixel}$, between 0 v and 500 v from the conventional voltage level of the luminance signal would be required.

Figure 2:
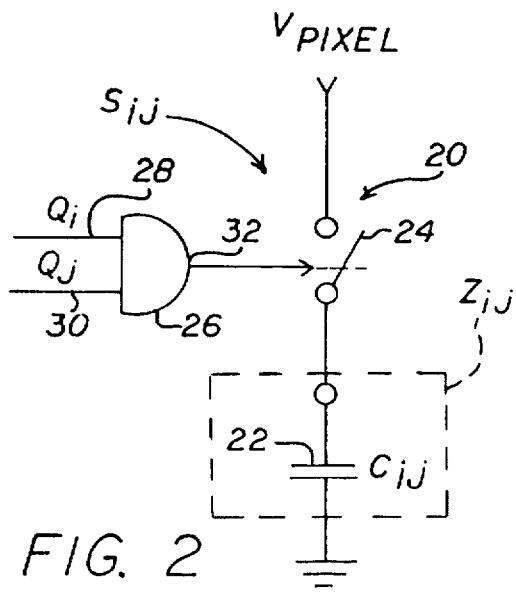
FIG. 2 is a functional circuit diagram of one switch cell.

With further reference to FIG. 2, there is shown a functional equivalent circuit 20 representing one switch cell, $S_{ij}$. In the circuit 20 shown in FIG. 2, the circuit element, $Z_{ij}$, of the video display system is represented as a capacitor 22 having a capacitance, $C_{ij}$. The equivalent circuit 20 for each of the switch cells, $S_{ij}$, includes a normally open switch 24 and an AND logic circuit 26.

The switch 24 is electrically coupled between the output of the amplifier 18 (FIG. 1) and a respective capacitor 22 (or circuit elements, $Z_{ij}$). The AND logic circuit 26 has a first input 28 and a second input 30. The first input 28 of the logic circuit 26 is coupled to the $i^{th}$ one, $Q_i$, of the M outputs, $Q_1$–$Q_M$. Similarly, the second input 30 of the logic circuit 26 is electrically coupled to the $j^{th}$ one, $Q_j$ of the N outputs, $Q_1$–$Q_N$. As best seen in FIG. 2, the logic circuit 26 further has an output 32 which activates the switch 24.

Figure 4:
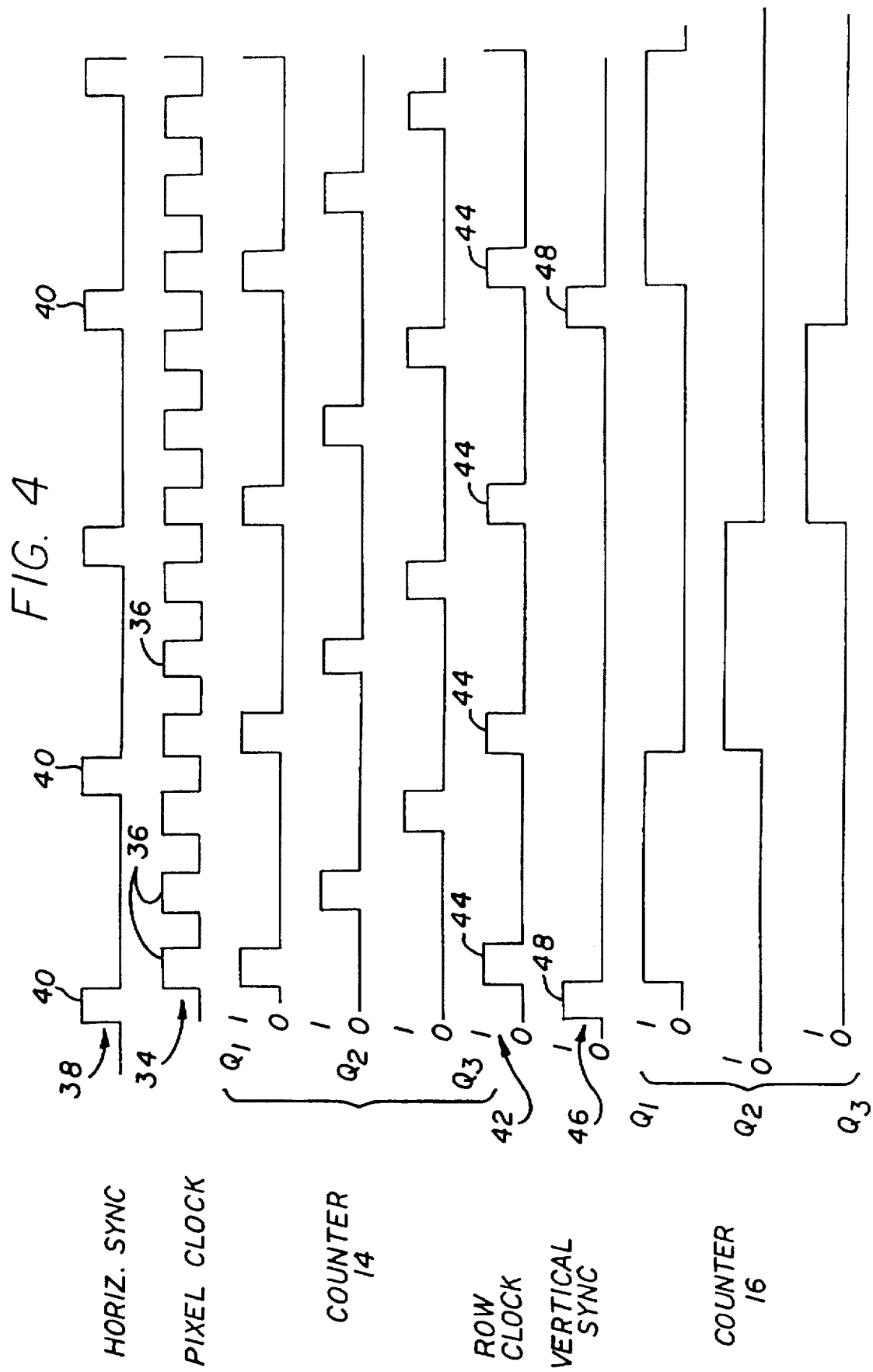
FIG. 4 is a timing diagram useful in explaining the operation of the switch matrix of FIG. 1.

With further reference to FIG. 4, the operation of the above described apparatus is described. Although the description of FIG. 4 is in reference to a simplified 3×3 array, it should be obvious to those skilled in the art that the following description is readily adaptable to describe the operation of the generalized M×N array described above.

The pixel clock 12 develops a first clock signal 34. The first clock signal 34 has a plurality of first clock pulses 36. The first clock pulses 36 occur at a rate commensurate with the electronic scan rate of the pixels. The reset input, R, of the first counter is adapted to have the horizontal sync signal 38 applied thereto. As is well known in the art, the horizontal sync signal 38 has a plurality of horizontal sync pulses 40. Generally, the first counter 14 in response to each of the first clock signal 36 and the horizontal sync signal 38 develops a first logic state at a $j^{th}$ one, $Q_j$, of the first outputs, $Q_1$–$Q_N$.

upon the occurrence of a $j^{th}$ clock pulse of the first clock pulses 36 subsequent to a sync pulse 40 of the horizontal sync signal 38. In the simplified timing diagram of FIG. 4, the outputs, $Q_1$, $Q_2$ and $Q_3$ of the first counter 14 respectively develop a binary 1 at the first, second and third one of the first clock pulses 36 following a sync pulse 40. It is noted that whenever one of the outputs, $Q_j$, of the first counter is at a binary 1, all the other outputs of the first counter have a second logic state at the $j^{th}$ clock pulse. The second logic state is a binary 0. In further response to each of the pixel clock signal 34 and the horizontal sync signal 38, the first counter 14 develops a second clock signal 42 at the second output, O. The second clock signal 42 has a plurality of second clock pulses 44. Each of the second clock pulses 44 occurs when a first one (j=1) of the N outputs, $Q_1$–$Q_N$, is at the first logic state, as seen in FIG. 4.

The second clock signal 42 is applied to the clock input, C, of the second counter 16. The reset input, R, of the second counter 16 has the vertical sync signal 46 applied thereto. The vertical sync signal 46 includes a plurality of vertical sync pulses 48. In response to the second clock signal 42 and the vertical sync signal 46, the $i^{th}$ one of the M outputs, $Q_1$–$Q_M$, has the first logic state upon occurrence of an $i^{th}$ clock pulse of the second clock pulses 44 subsequent to each sync pulse 48 of the vertical sync signal 46. Each of the other M outputs, $Q_1$–$Q_M$, has the second logic state at the $i^{th}$ clock pulse. In the simplified timing diagram of FIG. 4, the outputs, $Q_1$, $Q_2$ and $Q_3$ of the second counter 16 respectively develop a binary 1 at the first, second and third one of the second clock pulses 44 following a vertical sync pulse 48.

Referring again to FIG. 2, when each of the $i^{th}$ one of the M outputs, $Q_1$–$Q_M$, and the $j^{th}$ one of the N outputs, $Q_1$–$Q_N$, is at the first logic state or binary 1, the output of the AND gate 32 goes high. The switch 24 for the switch cell, $S_{ij}$, closes to apply the luminance signal to the respective one of the circuit elements, $Z_{ij}$, or as best seen in FIG. 2, the capacitor 22.

Figure 3:
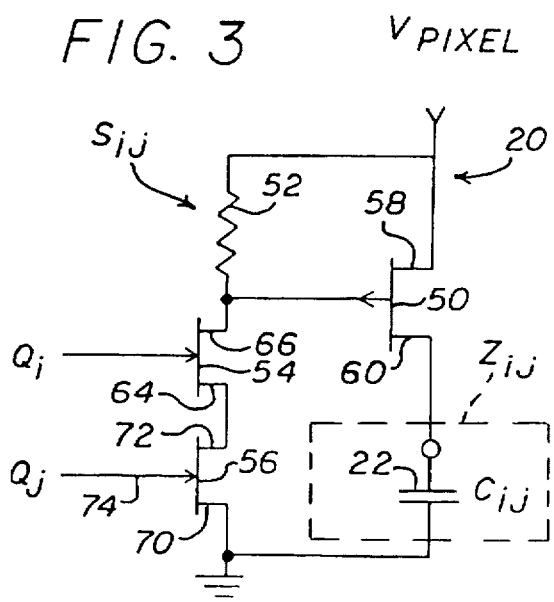
FIG. 3 is a more detailed circuit diagram for each switch cell.

With reference to FIG. 3, there is shown a preferred embodiment of the circuit 20 of FIG. 2 for each of the switch cells, $S_{ij}$. The switch cell, $S_{ij}$, of FIG. 3 includes a p-channel MOSFET 50, a resistor 52, a first n-channel MOSFET 54, and a second n-channel MOSFET 56.

The p-channel MOSFET has a source 58, a drain 60, and a gate 62. The source 58 is electrically coupled to the output of the amplifier 18 to have the luminance signal applied thereto. The drain 60 is adapted to be electrically coupled to a respective one of the circuit elements, $Z_{ij}$, and in particular the capacitor 22.

The first n-channel MOSFET 54 has a source 64, a drain 66, and a gate 68. The resistor 52 is electrically coupled in series between the drain 66 of the first n-channel MOSFET 54 and the output of the amplifier 18 to couple resistively the luminance signal to the drain 66 of the first n-channel MOSFET 54. The gate 62 of the p-channel MOSFET 50 is-also electrically coupled to the drain 66 of the first n-channel MOSFET 54. The gate 68 of the first n-channel MOSFET 54 is electrically coupled to the $i^{th}$ one, $Q_i$, of the M outputs, $Q_1$–$Q_M$.

The second n-channel MOSFET 56 has a source 70, a drain 72, and a gate 74. The source 70 of the second n-channel MOSFET 56 is coupled to ground potential as best seen in FIG. 3. The drain 72 of the second n-channel MOSFET 56 is electrically coupled to the source 64 of the first n-channel MOSFET 54. The gate 74 of the second n-channel MOSFET 56 is electrically coupled to the $j^{th}$ one, $Q_j$, of the N outputs, $Q_1$–$Q_N$.

In operation, when the $i^{th}$ one, $Q_i$, of the M outputs, $Q_1$–$Q_M$, and the $j^{th}$ one, $Q_j$, of the N outputs, $Q_1$–$Q_N$, each go high to a binary 1, each of the first n-channel MOSFET 54 and the second n-channel MOSFET 56 become conductive, thereby pulling a current through resistor 52. The gate 62 of the p-channel MOSFET 50 goes to a low potential in response to this current. When the potential of the gate 62 goes low, the p-channel MOSFET 50 turns on coupling the luminance signal to the circuit element, $Z_{ij}$, or capacitor 22. In the embodiment where the capacitance, $C_{ij}$, is the capacitance across the piezoelectric, crystal, a high voltage could be needed to charge this capacitor. Therefore, the output, $V_{pixel}$, of the amplifier 18 should swing between 0 v and 500 v as hereinabove described. Of course, this requirement for the output voltage, $V_{pixel}$, is not necessary when low voltage pixel elements, $Z_{ij}$, are being used.

Figure 5:
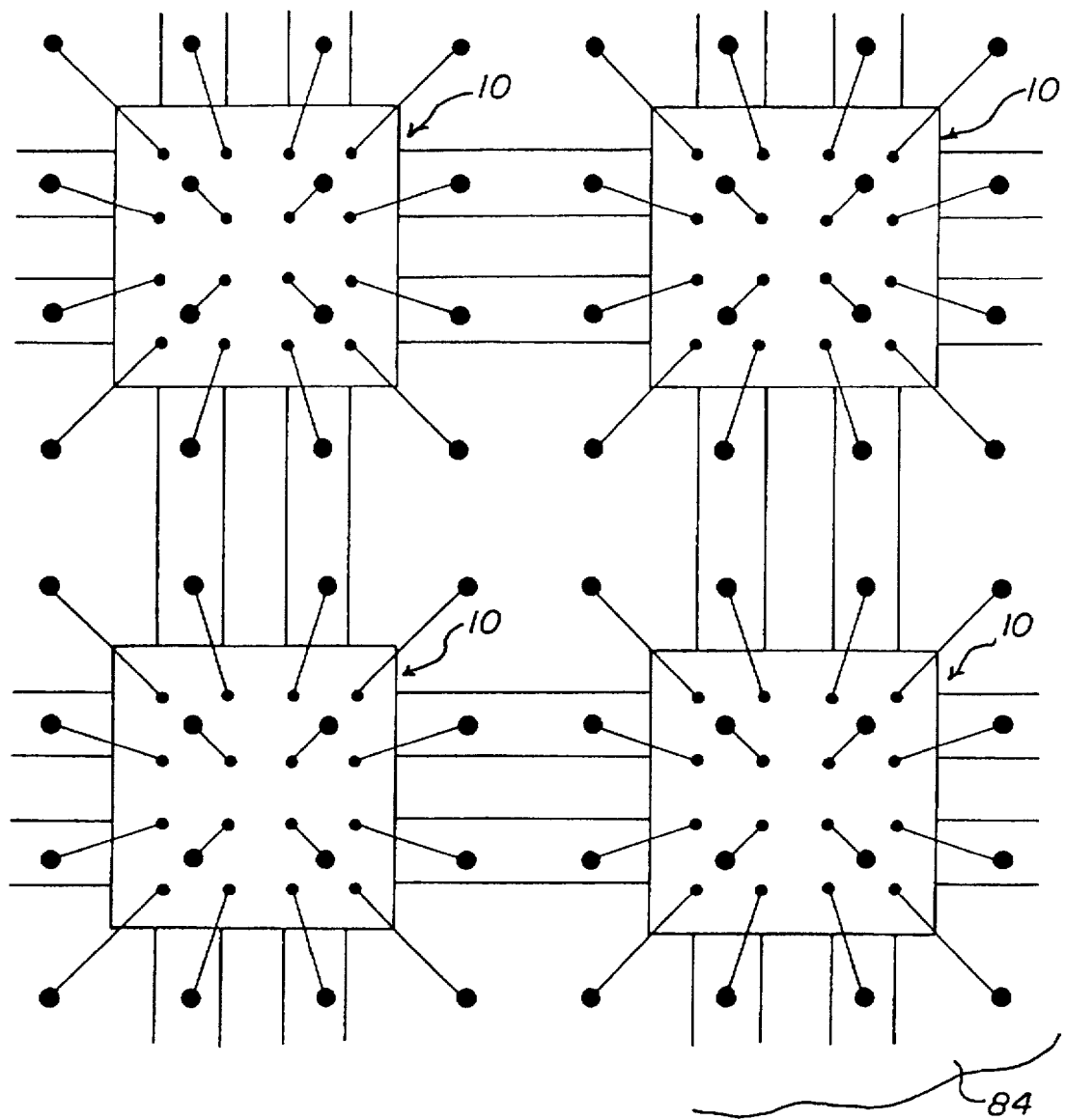
FIGS. 5 and 6 illustrate an exemplary use of the switch matrix integrated with a mirror array.
Figure 6:
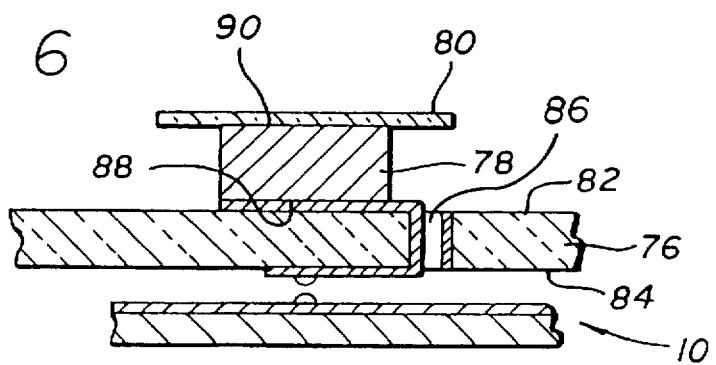

With reference to FIGS. 5 and 6, it is shown how the above described switch matrix 10 may be configured to construct a video display system in conjunction with the mirror arrays as described in the above referenced applications. The video display system includes an electrically insulative substrate 76, a plurality of piezoelectric members 78, a plurality of mirrors 80, and the switch matrix 10 as described hereinabove. In FIG. 5, there is shown how four separate 4×4 switch matrices 10 can be used to construct an 8×8 array. Of course, any size switch matrices 10 can be used, alone or with others, to construct any M×N sized array.

The substrate 76 has a top surface 82, a bottom surface 84 and an M×N array of holes 86 between the top surface 82 and bottom surface 84. Each of the piezoelectric members 78 is disposed on the top surface 82 adjacent to a respective one of the holes 86. Each of the piezoelectric members has a first metallized face 88 and a second metallized face 90. However, the metallized faces 88 and 90, as shown in FIG. 6, need not be parallel to surfaces 82 and 84. Each of the mirrors 80 is mounted to a respective one of the piezoelectric members 78.

The integrated circuit electronic switch matrix 10 is mounted to the bottom surface 84. Metal plating 92 is deposited in each of the holes 86 and extends partially onto surfaces 82 and 84 therefrom to connect the first metallized face 88 of each of the piezoelectric members 78 to a metallization 94 on the switch matrix 10 through one of the holes 86 adjacent thereto. FIG. 5 illustrates the interconnections between the switch matrix metallizations 94 and the piezoelectric members 78 through the plated path 92. The second metallized face 90 of each of the piezoelectric members 78 is coupled to ground potential, as described in the above referenced applications.

The switch matrix 10 operates as hereinabove described by switching the luminance signal to the first face of each of the piezoelectric members as hereinabove described. Each of the piezoelectric members 78 in response thereto causes a measured change in orientation of the respective one of the mirrors 80 mounted thereto. Each of the mirrors 80 thereby modulates the light intensity reflected therefrom as described in the above referenced applications. The modulated light intensity from each of the mirrors 80 corresponds to one of the pixels. The substrate 76 may be a ceramic substrate.

It is contemplated that the switch matrices of the present invention be further packaged into integrated circuits 100, as shown in FIG. 7. The individual integrated circuits 100 may be further assembled in forming a larger matrix. The integrated circuits 100 of FIG. 7 are exemplarily shown as being 8×8 matrices.

In an exemplary switch matrix formed by assembling a plurality of integrated circuits 100, as shown in FIG. 7, the clock pulses for row and column enabling are passed from the two counters to a first column and first row of switch matrix integrated circuits respectively, and from there to a subsequent such column and row, and so on. The various signals, such as clock pulses and luminance signal, are transmitted between adjacent integrated circuits by metal leads 102, constructed in accordance with the Tape Automated Bonding (TAB) technique commonly known in the art. on the exemplary integrated circuits 100, the metal leads 102 are on one side of the integrated circuit, and the metal plating 92 interconnections to the piezoelectric members 78 are on the other side.

There has been described hereinabove a novel electronic switch matrix particularly adapted for a video display system. Those skilled in the art may now make numerous uses of and modifications to the above described exemplary preferred embodiment of the switch matrix without departing from the inventive concepts disclosed herein. Accordingly, the present invention is to be defined solely by the scope of the following claims.

We claim:

1. A video display system comprising:

an electrically insulative substrate having a top surface, a bottom surface, and an M×N array of holes between said top surface and said bottom surface, said M×N array of holes corresponding to an M×N array of pixels;

a plurality of piezoelectric members, each of said members being disposed on said top surface adjacent to a respective one of said holes, each of said piezoelectric members having a first metallized face and a second metallized face;

a plurality of mirrors, each of said mirrors being mounted to a respective one of said piezoelectric members;

an integrated circuit electronic switch matrix mounted to said bottom surface said switch matrix comprising an M×N array of switch cells and a metallization disposed on said matrix adjacent said bottom surface of said substrate;

means for electrically connecting said first metallized face of each of said piezoelectric members to said switch matrix through said holes; and a metal plating disposed in each of said holes in intimate electrical contact with said metallization on said switch matrix and said first face of each said piezoelectric members;

said switch matrix developing a plurality of electrical signals, each of said signals corresponding to an intensity of a respective one of said pixels, each of said electrical signals being applied to said first face of a respective one of said piezoelectric members, each of said piezoelectric members in response thereto changing an orientation of one of said mirrors mounted thereto, each of said mirrors thereby effecting modulation of light intensity reflected therefrom wherein the modulated light intensity from each of said mirrors corresponds to one of said pixels.

2. A video display system as set forth in claim 1 wherein said substrate is a ceramic substrate.

3. A video display system as set forth in claim 1 wherein:

said electronic switch matrix is assembled into a plurality of modular units, each of said units having a top part, a bottom part and four side parts, said bottom part having a plurality of electrical contacts providing said electrically connecting means between said piezoelectric members and said switch matrix, and said side portions having a plurality of electrical interconnection leads carrying said luminance signal, said M outputs and said N outputs between said units; and said units comprising a fixed matrix size wherein said units can be further linked forming larger matrix sizes.

4. A video display system as set forth in claim 3 wherein said fixed matrix size is 8×8.

5. In a video display system including a source of light energy, an electrically insulative substrate having a top surface and a bottom surface, a plurality of piezoelectric members disposed in an M×N array on said top surface, a plurality of mirrors, at least one aperture, and means for focusing and projecting light energy, each of said piezoelectric members having a first metallized face and a second metallized face, said second metallized face of each of said piezoelectric members being commonly electrically interconnected, each of said mirrors being attached to a respective one of said piezoelectric members, wherein said light energy incident on one of said mirrors is reflected in a direction toward said aperture and further wherein a voltage applied to said first metallized of said respective one of said piezoelectric members deforms said respective one of said piezoelectric members to change the orientation of said mirror with respect to said light energy incident thereon to change the path of reflected light energy from said mirror, thereby modulating the intensity of said light energy emanating form said aperture, said focusing and projecting means utilizing said light energy emanating from said aperture, the improvement comprising:

a plurality of holes disposed in an M×N array between said top surface and said bottom surface of said substrate, each of said holes being associated with a respective on of said piezoelectric members;

an electrically conductive metal plating formed in each of said holes extending partially onto each of said top surface and said bottom surface of said substrate, said metal plating in one of said holes being electrically isolated form said metal plating in each other of said holes, said first metallized face of each of said piezoelectric members being in intimate electrical contact with said metal plating in each associated respective one of said holes;

an integrated circuit electronic switch matrix mounted to said bottom surface said switch matrix comprising an M×N array of switch cells to develop said voltage for application to said first metallized face of a respective one of said piezoelectric members, and a metallization on said matrix to conduct said voltage developed by each of said switch cells for application to said first metallized face of a respective one said piezoelectric members, said metallization being disposed in intimate electrical contact with said metal plating in each of said holes.

* * * * *